United States Patent
Kubota et al.

(10) Patent No.: US 9,897,834 B2
(45) Date of Patent: Feb. 20, 2018

(54) LIGHT SENSOR ATTACHMENT STRUCTURE OF IMAGE DISPLAY DEVICE

(71) Applicant: EIZO Corporation, Ishikawa (JP)

(72) Inventors: Masaru Kubota, Ishikawa (JP); Kentaro Kojima, Ishikawa (JP); Katsuhiko Matsunami, Ishikawa (JP); Naoshi Isobe, Ishikawa (JP); Shosaku Ikeda, Ishikawa (JP); Kazuya Murata, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 15/613,457

(22) Filed: Jun. 5, 2017

(65) Prior Publication Data

US 2017/0269415 A1 Sep. 21, 2017

Related U.S. Application Data

(62) Division of application No. 14/770,016, filed as application No. PCT/JP2013/073089 on Aug. 29, 2013, now abandoned.

(30) Foreign Application Priority Data

Feb. 25, 2013 (JP) .................................. 2013-034517

(51) Int. Cl.
*H01J 40/14* (2006.01)
*G02F 1/133* (2006.01)
*G02F 1/1335* (2006.01)

(52) U.S. Cl.
CPC .... *G02F 1/13318* (2013.01); *G02F 1/133608* (2013.01); *G02F 1/133605* (2013.01); *G02F 2201/54* (2013.01); *G02F 2201/58* (2013.01)

(58) Field of Classification Search
CPC ......... G02F 1/133608; G02F 1/133605; G02B 6/4201
See application file for complete search history.

(56) References Cited

U.S. PATENT DOCUMENTS

| 6,188,380 B1 | 2/2001 | Kawashima et al. |
| 2007/0121318 A1 | 5/2007 | Nanbu |

(Continued)

FOREIGN PATENT DOCUMENTS

| JP | 10-222084 A | 8/1998 |
| JP | 2000-315596 A | 11/2000 |

(Continued)

OTHER PUBLICATIONS

Chinese Office Action dated Feb. 14, 2016, in connection with corresponding CN Application No. 201380073723.8 (10 pgs., including English translation).

(Continued)

*Primary Examiner* — Thanh Luu
(74) *Attorney, Agent, or Firm* — Maier & Maier, PLLC

(57) ABSTRACT

Provided is an optical sensor mounting structure which is used in an image display device and in which the gap between a reflection sheet and a tubular cushion for preventing the entry of external light into an optical sensor is eliminated so that the amount of light from a backlight can be measured accurately. A liquid crystal image display device includes an optical sensor that measures light from the back surface of a reflection sheet, a substrate having the optical sensor thereon, and a tubular cushion for preventing the entry of external light into the optical sensor. The front surface of the tubular cushion is bonded to the reflection sheet, and the back surface thereof is bonded to the substrate.

3 Claims, 5 Drawing Sheets

(56) References Cited

U.S. PATENT DOCUMENTS

| | | | |
|---|---|---|---|
| 2009/0140656 A1 | 6/2009 | Kohashikawa et al. | |
| 2009/0262276 A1 | 10/2009 | Jeong | |
| 2011/0042766 A1* | 2/2011 | Kurokawa | G02F 1/133514 |
| | | | 257/432 |

FOREIGN PATENT DOCUMENTS

| | | |
|---|---|---|
| JP | 2005071702 A | 3/2005 |
| JP | 2007-149540 A | 6/2007 |
| JP | 2007148177 A | 6/2007 |
| JP | 2009-014901 A | 1/2009 |
| JP | 2009-058678 A | 3/2009 |
| JP | 2009-265661 A | 11/2009 |
| JP | 2012-242269 A | 12/2012 |
| TW | I260446 B | 3/2005 |

OTHER PUBLICATIONS

International Search Report dated Nov. 19, 2013 from corresponding International Application No. PCT/JP2013/073089; 5 pgs.

\* cited by examiner (a)          (b)          (c)

(a)          (b)          (c)

S1 (NO GAP OR SMALL GAP)

S2 (GAP EXISTS OR LARGE GAP)

LIGHT SENSOR ATTACHMENT STRUCTURE OF IMAGE DISPLAY DEVICE

TECHNICAL FIELD

The present invention relates to an optical sensor mounting structure for use in image display devices.

BACKGROUND ART

Image display devices such as liquid crystal displays, organic electroluminescent displays, and plasma displays provide high-definition image quality with low power consumption. Such image display devices are also slim due to the flat screens thereof. These image display devices are being used not only in offices or households but also at sites of various kinds of professional work, such as graphic design and medical care.

In a liquid crystal image display device, the reproducibility of the display image is increased, for example, by measuring light from the back surface of a reflection sheet disposed behind a backlight in an image display unit to control the luminance of the backlight.

Patent Literature 1 discloses that an optical sensor for detecting light of a backlight leaking from a reflection sheet is disposed over the back surface of a liquid crystal display unit (in claim 1 thereof). It also states that a photodetector includes a cushion member for guiding only light leaking from the reflection sheet to the optical sensor and that the cushion member is a donut cushion and is in close contact with a liquid crystal module to shield light (in paragraph [0013] thereof).

Patent Literature 2 discloses that a luminance sensor is mounted on an aperture formed in the back surface of a casing and that a reflection sheet also has an aperture as necessary (in paragraph [0025] thereof).

Patent Literature 3 discloses that an optical sensor is mounted over the back surface of a chassis with a base therebetween, that a circular hole having a diameter of 3 mm is formed as a reflection sheet hole in a reflection sheet which lies in front of the optical sensor, and that a circular hole having a diameter of 30 mm or less is formed as a chassis hole in the chassis, which lies in front of the optical sensor (in paragraphs [0010] to [0011] thereof).

Patent Literature 4 discloses the following image display device: the image display device includes a reflection sheet disposed on the back surface of a backlight lamp and configured to reflect light emitted from the backlight lamp forward, an optical sensor disposed on the back surface of the reflection sheet and configured to detect light introduced through a first aperture formed in the reflection sheet, and a control unit that controls the luminance of the backlight lamp on the basis of the detection result of light applied to the optical sensor; a sensor holder housing the optical sensor is disposed on the back surface of the reflection sheet; the sensor holder has a second aperture having a smaller area than that of the first aperture in the inner region of the first aperture; the sensor holder also has a reflection part on a surface which is near the reflection sheet adjacent to the second aperture and which is exposed from the first aperture; and light from the backlight lamp is introduced into the optical sensor through the first and second apertures (in claim 1 thereof).

CITATION LIST

Patent Literature

Patent Literature 1: Japanese Unexamined Patent Application Publication No. 10-222084 (Japanese Patent No. 3171808)

Patent Literature 2: Japanese Unexamined Patent Application Publication No. 2000-315596

Patent Literature 3: Japanese Unexamined Patent Application Publication No. 2009-014901

Patent Literature 4: Japanese Unexamined Patent Application Publication No. 2009-58678 (Japanese Patent No. 4769969)

SUMMARY OF INVENTION

Technical Problem

A liquid crystal panel module has a reflection sheet and a panel metal sheet flexibly incorporated therein. Specifically, since the perimeter of the reflection sheet is simply mounted on the edge of the panel metal sheet, portions closer to the center, of the reflection sheet are more flexible. For this reason, due to the influence of the heat of the backlight or the like, the reflection sheet becomes deformed, or the amount or manner of the deformation of the originally deformed reflection sheet varies. Through an investigation, the present inventors found that the amount of light acquired by the optical sensor increased or decreased due mainly to such deformation. Liquid crystal image display devices are currently increasing in screen size or slimming, and the amount of deformation of the reflection sheet is thought to be increasing accordingly.

However, Patent Literatures 1 to 4 do not state that the reflection sheet becomes deformed due to the influence of the heat of the backlight or the like or that the amount or manner of deformation of the reflection sheet varies due to such influence. Further, these Patent Literatures do not include any description suggesting that the amount of light acquired by the optical sensor increases or decreases due mainly to the deformation of the reflection sheet.

Through an investigation, the present inventors found that there were models in which even if there was no gap (there is a small gap) between the tubular cushion and reflection sheet in the initial state, the reflection sheet became deformed due to the influence of the heat of the backlight or the like and thus a gap occurred (or the gap became larger) between the tubular cushion and reflection sheet. The present inventors also found that there were models in which even if there was a gap (there was a large gap) between the tubular cushion and reflection sheet in the initial state, the reflection sheet became deformed due to the influence of the heat of the backlight or the like and thus the gap disappeared (or the gap became smaller) between the tubular cushion and reflection sheet. That is, the manner that the reflection sheet becomes deformed with the temperature is not uniform. The present inventors then found that the amount of light from the reflection sheet increased or decreased according to the presence or absence of the gap or the size of the gap and thus the correlation between the change in the luminance of the liquid crystal display panel and the value measured by the optical sensor varied.

FIG. 20 is a schematic front view of a known liquid crystal image display device 101. FIGS. 21 and 22 are sectional views taken along line A-A of FIG. 20 and are main part sectional views of the liquid crystal image display device 101 seen from above. The known liquid crystal image display device 101 includes a liquid crystal display panel 102, a backlight 103 disposed behind the liquid crystal display panel 102, a reflection sheet 104 disposed behind the backlight 103, a panel metal sheet 105 disposed behind the reflection sheet 104, and a base metal sheet 106 disposed behind the panel metal sheet 105 (FIGS. 21, 22). The liquid crystal image display device 1 also includes an optical sensor 112 that measures light from the back surface of the reflection sheet 104, a substrate 111 having the optical sensor 112 thereon, and a tubular cushion 113 for preventing the entry of external light into the optical sensor 112 (FIGS. 21, 22). The substrate 111 is mounted in such a manner to block a through hole 1061 of the base metal sheet 106, and the tubular cushion 113 is mounted in such a manner to block a lighting hole 1051 of the panel metal sheet 105 (FIGS. 21, 22).

Through an investigation, the present investors found a model as shown in FIG. 22. In this model, when the liquid crystal panel modules 102 to 105 were heated, the reflection sheet 104 became distorted in a direction opposite to that in FIG. 21, that is, the center of the reflection sheet 104 moved forward (toward the front); the gap was changed from S1 to S2; and thus the amount of light entering the optical sensor 112 increased. The present investors also found a model as shown in FIG. 21. In this model, when the liquid crystal panel modules 102 to 105 were heated, the reflection sheet 104 became distorted in a direction opposite to that in FIG. 22, that is, the center of the reflection sheet 104 moved backward (toward the back); the gap was changed from S2 to S1; and thus the amount of light entering the optical sensor 112 decreased. The present inventors then found that the amount of light from the reflection sheet 104 increased or decreased according to the presence or absence of the gap or the size of the gap and thus the correlation between the change in the luminance of the liquid crystal display panel 102 and the value measured by the optical sensor 112 varied.

As described above, liquid crystal image display devices are increasing in screen size or slimming, and the amount of deformation of the reflection sheet is thought to be increasing accordingly. However, the manner that the deformation changes with the temperature, external force, or the like is difficult to predict. As a result, the correlation between the change in the luminance of the liquid crystal display panel and the value measured by the optical sensor varies.

Accordingly, an object of the present invention is to provide an optical sensor mounting structure which is used in an image display device and in which the gap between a reflection sheet and a tubular cushion for preventing the entry of external light into an optical sensor is eliminated so that the amount of light from a backlight can be measured accurately.

Solution to Problem

The present invention provides an optical sensor mounting structure for use in image display devices. The structure includes an optical sensor configured to measure light from a back surface of a reflection sheet in an image display device, a substrate having the optical sensor thereon, and a tubular cushion for preventing entry of external light into the optical sensor. A front surface of the tubular cushion and the reflection sheet are bonded together, and a back surface of the tubular cushion and the substrate are bonded together.

According to the present invention, the gap between the tubular cushion and reflection sheet is eliminated so that the amount of light from the backlight can be measured accurately. Specifically, since the front and back surfaces of the tubular cushion are bonded to predetermined positions, the distance between the area serving as a measurement light source on the back surface of the reflection sheet and the optical sensor is kept constant. The size of the area serving as a measurement light source on the back surface of the reflection sheet is also kept constant. Thus, the amount of light from the backlight can be measured accurately.

Examples of the configuration for eliminating the gap between the tubular cushion and reflection sheet include the above configuration, as well as an optical sensor mounting structure which is used in an image display device and which includes an optical sensor configured to measure light from a back surface of a reflection sheet in the image display device, a substrate having the optical sensor thereon, and a tubular cushion for preventing entry of external light into the optical sensor. In this optical sensor mounting structure, a base metal sheet having a light-receiving hole through which the optical sensor receives light is disposed over the back surface of the reflection sheet; the substrate is mounted on the base metal sheet; a front surface of the tubular cushion and the reflection sheet are bonded together; and a back surface of the tubular cushion and the base metal sheet are bonded together.

Examples of the configuration in which the substrate and the back surface of the tubular cushion are bonded together include a configuration in which the substrate and the back surface of the tubular cushion are bonded together and a configuration in which a substrate unit including the substrate and a frame surrounding the substrate, and the back surface of the tubular cushion are bonded together. Examples of the configuration in which the substrate is mounted on the base metal sheet include a configuration in which the substrate is mounted on the base metal sheet by fixing means such as an adhesive, a double-sided tape, or a screw, a configuration in which a substrate unit including the substrate and a frame surrounding the substrate is mounted on the base metal sheet by fixing means such as an adhesive, a double-sided tape, or a screw, and a configuration in which the substrate is mounted over the base metal sheet with a cushion member therebetween.

Examples of an adhesive include a rubber-based adhesive, an acrylic-based adhesive, and an epoxy-based adhesive. If a double-sided tape is used, the above bonding can be easily performed by sticking double-sided tapes to the front and back surfaces of the tubular cushion.

The tubular cushion is in the shape of, for example, a cylindrical tube, a rectangular tube, a hexagonal tube, or other polygonal tubes. Examples of the material of the tubular cushion include a rubber material such as urethane or silicone and a sponge foam formed of a rubber material such as urethane or silicone. Other known cushion materials may be used.

The substrate having the optical sensor thereon may be an optical sensor-packaged substrate or a plate for positioning the optical sensor.

In the present invention, a panel metal sheet is preferably disposed behind the reflection sheet; there is preferably further included a second cushion disposed outside the tubular cushion serving as a first cushion and configured to support the substrate; a front surface of the second cushion and the panel metal sheet are preferably bonded together; and/or a back surface of the second cushion and the substrate are preferably bonded together.

According to the present invention, the substrate is supported more stably.

Examples of the configuration in which the substrate is supported more stably include the above configuration, as well as an optical sensor mounting structure which is used in an image display device and in which a panel metal sheet is disposed behind the reflection sheet; a base metal sheet is disposed behind the panel metal sheet; there is further included a second cushion disposed outside the tubular cushion serving as a first cushion and configured to support the substrate; and a front surface of the second cushion and the substrate are bonded together and/or a back surface of the second cushion and the base metal sheet are bonded together.

The tubular cushion is formed of, rubber, elastomer, or the like. More specifically, it is formed of polyethylene sponge, urethane sponge, or the like. To improve light-shielding performance, as well as to allow the tubular cushion to contact the reflection sheet softly, a closed-cell sponge is preferably used as the tubular cushion. The tubular cushion is bonded to the reflection sheet using a double-sided tape, adhesive, pressure-sensitive adhesive, or the like. Note that the tubular cushion member is not limited to a tubular cushion member which is hollowed and molded in one piece. A tubular cushion member formed by bonding multiple block-shaped sponges together may be used as long as light-shielding performance can be maintained.

Examples of an adhesive include a rubber-based adhesive, an acrylic-based adhesive, and an epoxy-based adhesive. If a double-sided tape is used, the above bonding can be easily performed by sticking double-sided tapes to the front and back surfaces of the respective cushions (first cushion, second cushion).

The respective cushions (first cushion, second cushion) are in the shape of, for example, a cylindrical tube, a rectangular tube, a hexagonal tube, or other polygonal tubes. Multiple block-shaped cushions such as prismatic cushions or cylindrical cushions may be disposed. Examples of the material of the cushions (first cushion, second cushion) include a sponge foam formed of a rubber material such as urethane or silicone. Other known cushion materials may be used.

In the configuration in which the first and second cushions are included, rubber hardness of the second cushion is preferably lower than rubber hardness of the first cushion.

According to the present invention, the first cushion keeps the distance between the optical sensor and reflection sheet constant, and the second cushion allows the optical sensor and reflection sheet to easily follow the displacement of the substrate caused by the warpage or deformation of the panel metal sheet or base metal sheet.

In the configuration in which the panel metal sheet is included, a lighting hole is preferably formed in the panel metal sheet, and the first cushion is preferably contactlessly disposed in the panel metal sheet.

According to the present invention, due to the first cushion, the distance between the optical sensor and reflection sheet is insusceptible to the displacement of the substrate caused by the warpage or deformation of the panel metal sheet. That is, the first cushion keeps the distance between the optical sensor and reflection sheet constant.

The shape of the lighting hole of the panel metal sheet may be a circle, an oval, a rectangle, a hexagon, or other polygons. The lighting hole may be formed in the center of the panel metal sheet or may be formed adjacent to an edge thereof. The present invention is also applied to a configuration in which a small hole for measuring light is formed in the reflection sheet. The shape of the small hole in the reflection sheet may be a circle, an oval, a rectangle, a hexagon, or other polygons. The small hole may be formed in the center of the reflection sheet or may be formed adjacent to an edge thereof.

The present invention also provides an optical sensor mounting structure for use in image display devices. The structure includes an optical sensor configured to measure light from a back surface of a reflection sheet in an image display device, a substrate having the optical sensor thereon, and a tubular cushion for preventing entry of external light into the optical sensor. A base metal sheet having a light-receiving hole through which the optical sensor receives light is disposed over a back surface of the reflection sheet; the substrate is mounted on the base metal sheet; the tubular cushion includes first and second tubular members; a front surface of the first tubular member and the reflection sheet are bonded together; and a back surface of the second tubular member and the base metal sheet are bonded together.

According to the present invention, even in the configuration in which the substrate is mounted on the base metal sheet, the gap between the tubular cushion and reflection sheet is eliminated so that the amount of light from the backlight can be measured accurately.

The shape of the light-receiving hole in the base metal sheet may be a circle, an oval, a rectangle, a hexagon, or other polygons. The light-receiving hole may be formed in the center of the base metal sheet or may be formed adjacent to an edge thereof.

In the present invention, a panel metal sheet is preferably disposed behind the reflection sheet; the base metal sheet is preferably disposed behind the panel metal sheet; a lighting hole is preferably formed in the panel metal sheet; and the first tubular member is preferably contactlessly disposed in the panel metal sheet.

According to the present invention, the first tubular member keeps the distance between the optical sensor and reflection sheet constant without being affected by the displacement associated with the warpage or deformation of the panel metal sheet.

In the present invention, there is preferably further included a sheet-shaped connecting member bonding together the first tubular member, the second tubular member, and the panel metal sheet.

According to the present invention, the respective members are connected and fixed to each other by the connecting member. Thus, the distance between the optical sensor and reflection sheet is easily kept constant, and the amount of light from the backlight is measured accurately with ease.

The shape of the connecting member may be a circle, a rectangle, a hexagon, or other polygons. The material of the connecting member may be a paper sheet, a resin sheet, a metal sheet, or the like. For example, a double-sided tape may be used as the connecting member.

In the present invention, rubber hardness of the second tubular member is preferably lower than rubber hardness of the first tubular member. According to the present invention, the second tubular member facilitates the following of the displacement associated with the warpage or deformation of the panel metal sheet or base metal sheet.

Examples of an image display panel in the image display device include a liquid crystal display panel. In a liquid crystal image display device, a backlight is disposed behind a liquid crystal display panel; a reflection sheet is disposed behind the backlight; a panel metal sheet is disposed behind the reflection sheet; and a base metal sheet is disposed behind the panel metal sheet.

The present invention also provides an image display device including any one of the above optical sensor mounting structures for use in image display devices. In the image display device, light from a back surface of a reflection sheet disposed behind a backlight is measured to control luminance of the backlight.

According to the present invention, there is provided a high-quality image display device that accurately measures the amount of light from the backlight to control the luminance of the backlight.

Advantageous Effects of Invention

According to the present invention, the front and back surfaces of the tubular cushion are bonded to the respective predetermined positions. Thus, the distance between the area serving as a measurement light source on the back surface of the reflection sheet and the optical sensor is kept constant. The area of the area serving as a measurement light source on the back surface of the reflection sheet is also kept constant. As a result, the amount of light from the backlight can be measured accurately.

According to the present invention, there is provided a high-quality image display device that accurately measures the amount of light from the backlight to control the luminance of the backlight. Further, there can be provided an image display device including the optical sensor mounting structure of the present invention without making a large change to the design.

BRIEF DESCRIPTION OF THE DRAWINGS

FIG. 13 includes diagrams showing a tubular cushion of the image display device of the above embodiment, in which FIG. 13(a) is a front view; FIG. 13(b) is a side view; and FIG. 13(c) is a rear view.

FIG. 15 includes diagrams showing a tubular cushion of the image display device of the above embodiment, in which FIG. 15(a) is a front view; FIG. 15(b) is a side view; and FIG. 15(c) is a rear view.

FIG. 18 includes diagrams showing a tubular cushion of the image display device of the above embodiment, in which FIG. 18(a) is a front view; FIG. 18(b) is a side view; and FIG. 18(c) is a rear view.

FIG. 19 includes diagrams showing another example of the tubular cushion of the image display device of the above embodiment, in which FIG. 19(a) is a front view; FIG. 19(b) is a side view; and FIG. 19(c) is a rear view.

DESCRIPTION OF EMBODIMENTS

Figure 1:
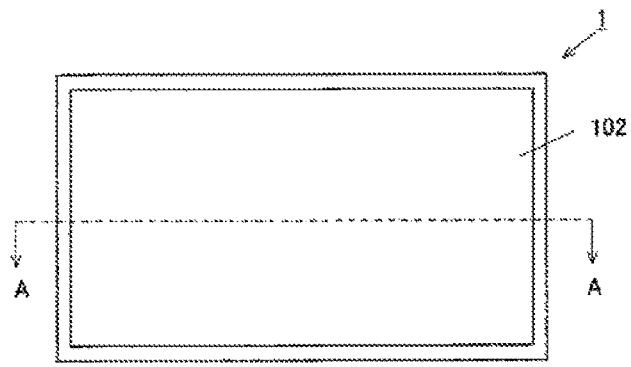
FIG. 1 is a schematic front view of an image display device including an optical sensor mounting structure of the present invention.
Figure 2:
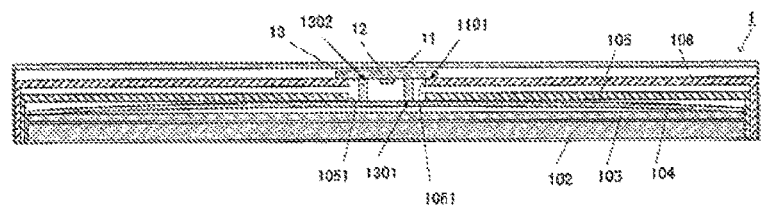
FIG. 2 is a main part sectional view of an image display device of an embodiment of the present invention seen from above.
Figure 3:
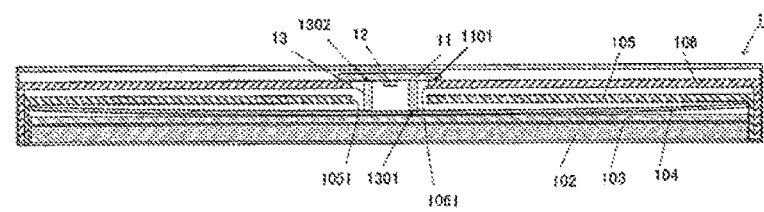
FIG. 3 is a main part sectional view of the image display device of the above embodiment seen from above and is a view at a different temperature.

Now, embodiments of the present invention will be described with reference to the drawings.
Embodiments of Present Invention
FIG. 1 is a schematic front view of an image display device including an optical sensor mounting structure of the present invention. Hereafter, a liquid crystal image display device 1 will be described as an example.
First Embodiment
FIGS. 2 and 3 are sectional views taken along line A-A of FIG. 1 and are main part sectional views of a liquid crystal image display device 1 of an embodiment of the present invention seen from above. FIGS. 2 and 3 show that a reflection sheet 104 becomes distorted in different manners at different temperatures. Specifically, FIG. 3 shows an example in which when liquid crystal panel modules 102 to 105 are heated, the reflection sheet 104 becomes distorted in a direction opposite to that in FIG. 2, that is, the center of the reflection sheet 104 moves forward (toward the front). FIG. 2 shows an example in which when the liquid crystal panel modules are heated, the reflection sheet 104 becomes distorted in a direction opposite to that in FIG. 3, that is, the center of the reflection sheet 104 moves backward (toward the back). However, the manner that the reflection sheet 104 becomes warped or deformed with the temperature is not limited to the above examples and varies among models.

The liquid crystal image display device 1 of the present embodiment includes a liquid crystal display panel 102, a backlight 103 disposed behind the liquid crystal display panel 102, the reflection sheet 104 disposed behind the backlight 103, a panel metal sheet 105 disposed behind the reflection sheet 104, and a base metal sheet 106 disposed behind the panel metal sheet 105 (FIGS. 2, 3). The liquid crystal image display device 1 also includes an optical sensor 12 that measures light from the back surface of the reflection sheet 104, a substrate 11 having the optical sensor 12 thereon, and a tubular cushion 13 for preventing the entry of external light into the optical sensor 12. The substrate 11 is mounted on the base metal sheet 106 in such a manner that it blocks a through hole 1061 of the base metal sheet 106 (FIGS. 2, 3). The substrate 11 is mounted on the base metal sheet 106 by fixing means such as an adhesive, double-sided tape, or screw. The substrate 11 may be mounted over the base metal sheet 106 with a cushion member therebetween. In the examples shown in FIGS. 2 and 3, the substrate 11 is bonded to the base metal sheet 106 using an adhesive 1101. The tubular cushion 13 is contactlessly inserted in a lighting hole 1051 of the panel metal sheet 105 (FIGS. 2, 3).

Figure 13:
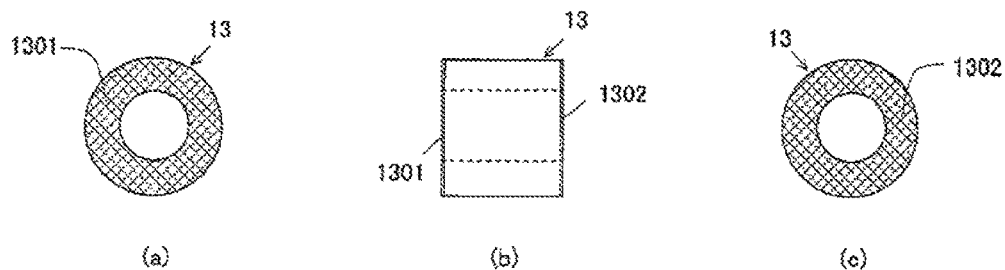

In the present embodiment, the front surface of the tubular cushion 13 is bonded to the reflection sheet 104, and the back surface thereof is bonded to the substrate 11 (FIGS. 2, 3). FIG. 13 includes diagrams showing the tubular cushion 13 of the present embodiment, in which FIG. 13(a) is a front view; FIG. 13(b) is a side view; and FIG. 13(c) is a rear view. The tubular cushion 13 has a double-sided tape 1301 stuck to the front surface thereof and a double-sided tape 1302 stuck to the back surface thereof. The tubular cushion 13 has a cylindrical shape and is made of a sponge foam formed of a rubber material such as urethane or silicone. While the tubular cushion 13 is bonded to the reflection sheet 104 and substrate 11 using the double-sided tapes 1301 and 1302 in the present embodiment, it may be bonded thereto using other means. For example, an adhesive such as a rubber-based adhesive, acrylic-based adhesive, or epoxy-based adhesive may be used.

According to the present embodiment, the front surface of the tubular cushion 13 is bonded to the reflection sheet 104, and the back surface thereof is bonded to the substrate 11. Thus, the gap between the tubular cushion 13 and reflection sheet 104 is eliminated so that the amount of light from the backlight 103 can be measured accurately. Specifically, since the front and back surfaces of the tubular cushion 13 are bonded to the predetermined positions, the distance between the area serving as a measurement light source on the back surface of the reflection sheet 104 and the optical sensor 12 is kept constant. The area of the area serving as a measurement light source on the back surface of the reflection sheet 104 is also kept constant. Thus, the amount of light from the backlight 103 can be measured accurately.

Second Embodiment

Figure 4:
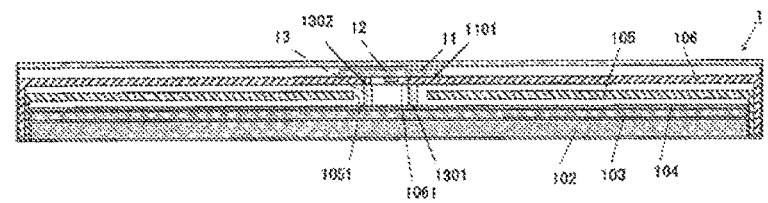
FIG. 4 is a main part sectional view of an image display device of another embodiment seen from above.

FIG. 4 is a main part sectional view of a liquid crystal image display device 1 of another embodiment seen from above. The same reference signs as those in the above embodiment denote the same functions and therefore description thereof will be omitted as appropriate. In the present embodiment, a substrate 11 is bonded to a base metal sheet 106. The front surface of a tubular cushion 13 is bonded to a reflection sheet 104, and the back surface thereof is bonded to the base metal sheet 106 (FIG. 4). According to the present embodiment, a small hole only has to be formed as a through hole 1061 of the base metal sheet 106, and the substrate 11 is supported strongly with ease.

Third Embodiment

Figure 5:
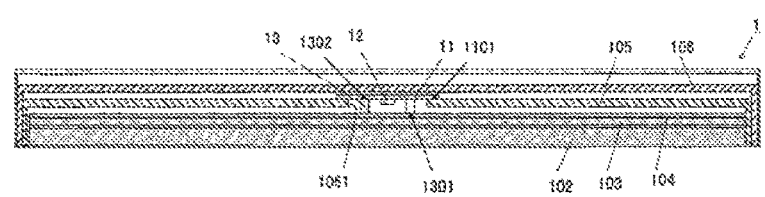
FIG. 5 is a main part sectional view of an image display device of another embodiment seen from above.

FIG. 5 is a main part sectional view of a liquid crystal image display device 1 of another embodiment seen from above. The same reference signs as those in the above embodiments denote the same functions and therefore description thereof will be omitted as appropriate. In the present embodiment, a substrate 11 is mounted on a panel metal sheet 105 (FIG. 5). According to the present embodiment, the distance from the light source to an optical sensor 12 is reduced. Thus, the amount of light from the backlight 103 can be measured accurately with ease even when the amount of light is small.

Fourth Embodiment

Figure 6:
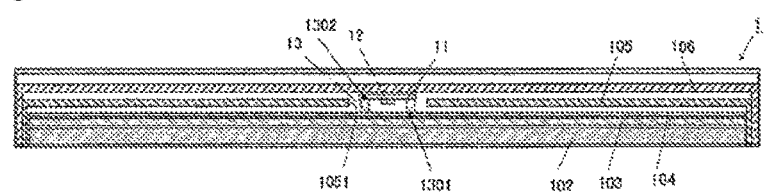
FIG. 6 is a main part sectional view of an image display device of another embodiment seen from above.

FIG. 6 is a main part sectional view of a liquid crystal image display device 1 of another embodiment seen from above. The same reference signs as those in the above embodiments denote the same functions and therefore description thereof will be omitted as appropriate. In the present embodiment, the length of a substrate 11 is set to a smaller size than the diameter of a lighting hole 1051 of a panel metal sheet 105 (FIG. 6). According to the present embodiment, the substrate 11 is insusceptible to the warpage or deformation of the panel metal sheet 105.

Fifth Embodiment

Figure 7:
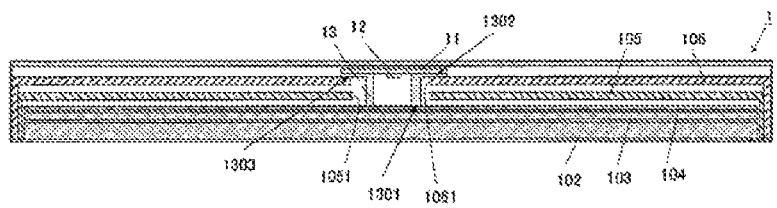
FIG. 7 is a main part sectional view of an image display device of another embodiment seen from above.

FIG. 7 is a main part sectional view of a liquid crystal image display device 1 of another embodiment seen from above. The same reference signs as those in the above embodiments denote the same functions and therefore description thereof will be omitted as appropriate. In the present embodiment, the back surface of a tubular cushion 13 is flanged, and a substrate 11 is mounted over a base metal sheet 106 with the flanged part of the tubular cushion 13 therebetween (FIG. 7). According to the present embodiment, the flanged part of the tubular cushion 13 serves as a cushion member. Thus, the substrate 11 is insusceptible to the warpage or deformation of the base metal sheet 106, as well as is less likely to be displaced.

Sixth Embodiment

Figure 8:
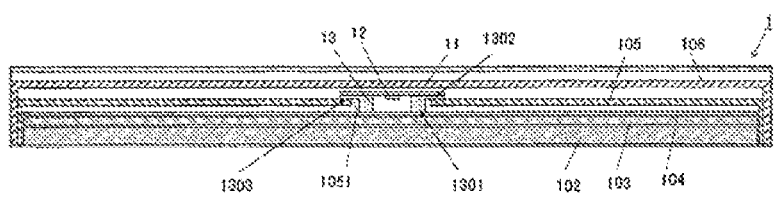
FIG. 8 is a main part sectional view of an image display device of another embodiment seen from above.

FIG. 8 is a main part sectional view of a liquid crystal image display device 1 of another embodiment seen from above. The same reference signs as those in the above embodiments denote the same functions and therefore description thereof will be omitted as appropriate. In the present embodiment, the back surface of a tubular cushion 13 is flanged, and a substrate 11 is mounted over a panel metal sheet 105 with the flanged part of the tubular cushion 13 therebetween (FIG. 8). According to the present embodiment, the flanged part of the tubular cushion 13 serves as a cushion member. Thus, the substrate 11 is insusceptible to the warpage or deformation of the panel metal sheet 105, as well as is less likely to be displaced.

Seventh Embodiment

Figure 9:
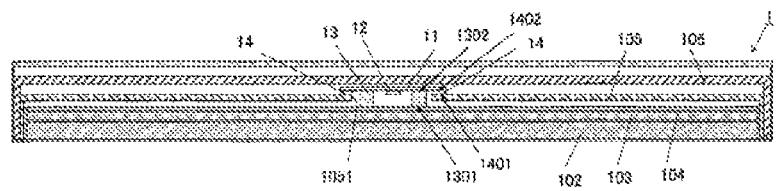
FIG. 9 is a main part sectional view of an image display device of another embodiment seen from above.

FIG. 9 is a main part sectional view of a liquid crystal image display device 1 of another embodiment seen from above. The same reference signs as those in the above embodiments denote the same functions and therefore description thereof will be omitted as appropriate. In the present embodiment, in addition to a tubular cushion 13, a cylindrical cushion 14 is disposed. The inner diameter of the cylindrical cushion 14 is set to a larger size than the outer diameter of the tubular cushion 13. The cylindrical cushion 14 has double-sided tapes 1401 and 1402 stuck to the front and back surfaces, respectively, thereof. The front surface of the cylindrical cushion 14 is bonded to a panel metal sheet 105, and the back surface thereof is bonded to the substrate 11. According to the present embodiment, the cylindrical cushion 14 serves as a cushion member. Thus, the substrate 11 is insusceptible to the warpage or deformation of the panel metal sheet 105, as well as is less likely to be displaced. Another configuration may be employed in which only the front surface of the cylindrical cushion 14 is bonded, and the back surface thereof is not bonded. Yet another configuration may be employed in which only the back surface of the cylindrical cushion 14 is bonded, and the front surface thereof is not bonded.

Eighth Embodiment

Figure 10:
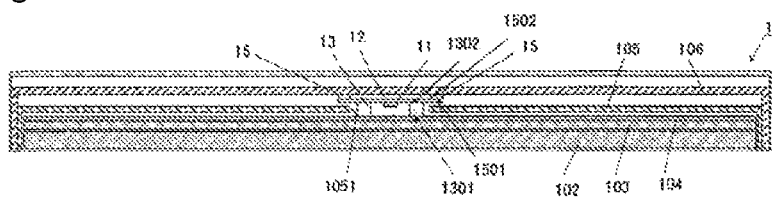
FIG. 10 is a main part sectional view of an image display device of another embodiment seen from above.

FIG. 10 is a main part sectional view of a liquid crystal image display device 1 of another embodiment seen from above. The same reference signs as those in the above embodiments denote the same functions and therefore description thereof will be omitted as appropriate. In the present embodiment, in addition to a tubular cushion 13, a cylindrical cushion 15 is disposed. The inner diameter of the cylindrical cushion 15 is set to a larger size than the outer diameter of the tubular cushion 13. The cylindrical cushion 15 has double-sided tapes 1501 and 1502 stuck to the front and back surfaces, respectively, thereof. The front surface of the cylindrical cushion 15 is bonded to a substrate 11, and the back surface thereof is bonded to a base metal sheet 106.

According to the present embodiment, the cylindrical cushion 15 serves as a cushion member. Thus, the substrate 11 is insusceptible to the warpage or deformation of the base metal sheet 106, as well as is less likely to be displaced. Another configuration may be employed in which only the front surface of the cylindrical cushion 15 is bonded, and the back surface thereof is not bonded. Yet another configuration may be employed in which only the back surface of the cylindrical cushion 15 is bonded, and the front surface thereof is not bonded.

Ninth Embodiment

Figure 11:
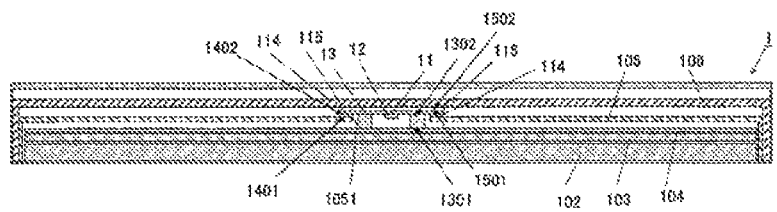
FIG. 11 is a main part sectional view of an image display device of another embodiment seen from above.
Figure 12:
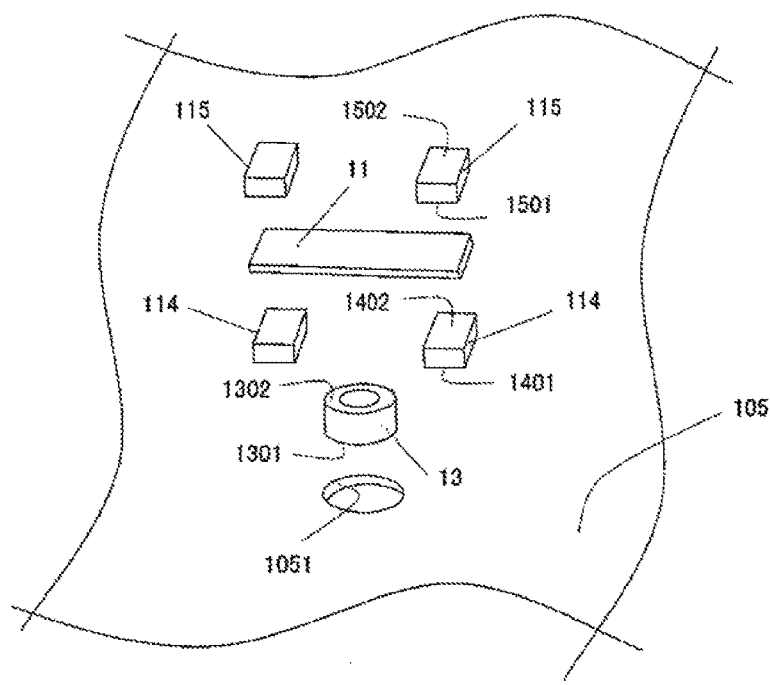
FIG. 12 is an exploded main part perspective view showing the positional relationships among components in the image display device of the above embodiment.

FIG. 11 is a main part sectional view of a liquid crystal image display device 1 of another embodiment seen from above. FIG. 12 is an exploded main part perspective view showing the positional relationships among components in the example shown in FIG. 11. The same reference signs as those in the above embodiments denote the same functions and therefore description thereof will be omitted as appropriate. In the present embodiment, two block-shaped cushions 114 are bonded to the front surface of a substrate 11 at a predetermined interval in such a manner to be located on both sides of the tubular cushion 13. Similarly, two block-shaped cushions 115 are bonded to the back surface of the substrate 11 at a predetermined interval in such a manner to be located on both sides of the tubular cushion 13 (FIGS. 11, 12). More specifically, the front surfaces of the block-shaped cushions 114 are bonded to the back surface of a panel metal sheet 105, and the back surfaces thereof are bonded to the front surface of the substrate 11. Similarly, the front surfaces of the block-shaped cushions 115 are bonded to the back surface of the substrate 11, and the back surfaces thereof are bonded to the front surface of a base metal sheet 106 (FIGS. 11, 12). According to the present embodiment, the substrate 11 is insusceptible to the warpage or deformation of the panel metal sheet 105, as well as is less likely to be displaced. Further, the sizes of the block-shaped cushions 114 and 115 can be suited to that of the substrate 11, for example, by cutting them as appropriate. For the block-shaped cushions 114, there may be employed a configuration in which only the front surfaces of the cushions 114 are bonded, and the back surfaces thereof are not bonded, or a configuration in which only the back surfaces of the cushions 114 are bonded, and the front surfaces thereof are not bonded. For the tubular cushions 115, there may be employed a configuration in which only the front surfaces of the cushions 115 are bonded, and the back surfaces thereof are not bonded, or a configuration in which only the back surfaces of the cushions 115 are bonded, and the front surfaces thereof are not bonded.

Hereafter, the tubular cushion 13 will be referred to as a first cushion, and the cushions 14, 114, and 115, which are disposed outside the first cushion and support the substrate 11, will be referred to as second cushions. The rubber hardness of the second cushions 14, 114, and 115 is set to a lower degree than that of the first cushion 13.

According to the present embodiment, the first cushion 13 keeps the distance between the light source and optical sensor 12 constant. Further, the second cushions 14, 114, and 115 serve as buffer members when the panel metal sheet 105 or base metal sheet 106 vibrates, for example, when receiving an external force. Thus, the substrate 11 is insusceptible to the vibration or the like of the panel metal sheet 105 or base metal sheet 106, as well as is less likely to be displaced.

While the lighting hole 1051 of the panel metal sheet 105 is in the shape of a circle in the example shown in FIG. 12, it may be in other shapes. For example, the lighting hole 1051 may be in the shape of an oval, a rectangle, a hexagon, or other polygons. The lighting hole 1051 may be disposed in the center of the panel metal sheet 105 or may be disposed adjacent to an edge thereof. The present invention is not limited to the above configuration and is also applied to a configuration in which a small hole for measuring light is formed in the reflection sheet 104. The small hole formed in the reflection sheet 104 is in the shape of, for example, a circle, an oval, a rectangle, a hexagon, or other polygons. The small hole may be formed in the center of the reflection sheet or may be formed adjacent to an edge thereof.

Tenth Embodiment

Figure 14:
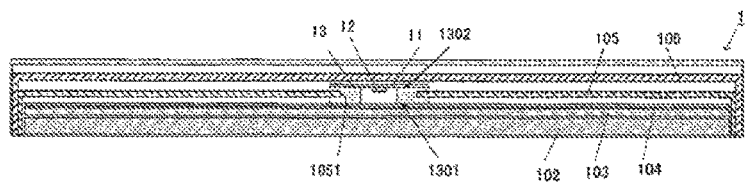
FIG. 14 is a main part sectional view of an image display device of another embodiment seen from above.
Figure 15:
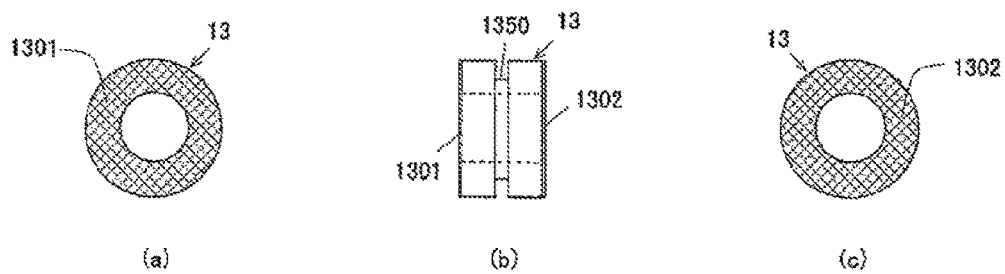

FIG. 14 is a main part sectional view of a liquid crystal image display device 1 of another embodiment seen from above. The same reference signs as those in the above embodiments denote the same functions and therefore description thereof will be omitted as appropriate. FIG. 15 includes diagrams showing a tubular cushion 13 of the present embodiment, in which FIG. 15(*a*) is a front view; FIG. 15(*b*) is a side view; and FIG. 15(*c*) is a rear view. The tubular cushion 13 has a constricted part 1350 on the side surface thereof [FIG. 15(*b*)]. The tubular cushion 13 is formed of a rubber material such as urethane or silicone or made of a sponge foam formed of a rubber material such as urethane or silicone. The tubular cushion 13 has a double-sided tape 1301 stuck to the front surface thereof and a double-sided tape 1302 stuck to the back surface thereof.

In the examples shown in FIGS. 14 and 15, the outer diameter of the constricted part 1350 on the side surface of the tubular cushion 13 is set to a size identical or close to the diameter of the lighting hole 1051 of a panel metal sheet 105. The width (vertical length) of the constricted part 1350 on the side surface of the tubular cushion 13 is also set to a size identical or close to the thickness of the panel metal sheet 105. In the present embodiment, the constricted part 1350 of the tubular cushion 13 is fitted in the lighting hole 1051 of the panel metal sheet 105 (FIG. 14). The front surface of the tubular cushion 13 is bonded to a reflection sheet 104, and the back surface thereof is bonded to the substrate 11 (FIG. 14). According to the present embodiment, the tubular cushion 13 is easy to mount, since the constricted part 1350 thereof is fitted into the lighting hole 1051 of the panel metal sheet 105. Further, the parts higher and lower than the constricted part 1350 serve as buffer members. Thus, the substrate 11 is insusceptible to the warpage or deformation of the panel metal sheet 105, as well as is less likely to be displaced.

Eleventh Embodiment

Figure 16:
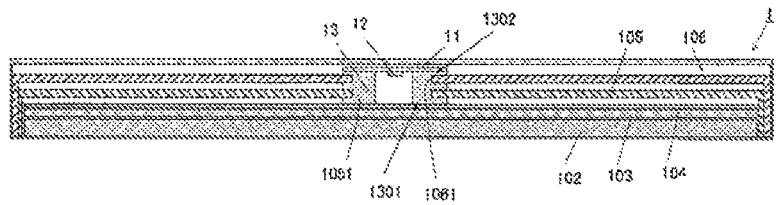
FIG. 16 is a main part sectional view of an image display device of another embodiment seen from above.

FIG. 16 is a main part sectional view of a liquid crystal image display device 1 of an eleventh embodiment seen from above. The same reference signs as those in the above embodiments denote the same functions and therefore description thereof will be omitted as appropriate. In the present embodiment, a tubular cushion 13 has two constricted parts formed on the side surface thereof at a predetermined interval (see FIG. 16). According to the present embodiment, the upper constricted part of the tubular cushion 13 is fitted in a through hole 1061 of a base metal sheet 106, and the lower constricted part thereof is fitted in a lighting hole 1051 of a panel metal sheet 105. The parts higher and lower than these constricted parts serve as cushion members. Thus, the substrate 11 is insusceptible to the warpage or deformation of the base metal sheet 106 and panel metal sheet 105, as well as is less likely to be displaced.

Twelfth Embodiment

Figure 17:
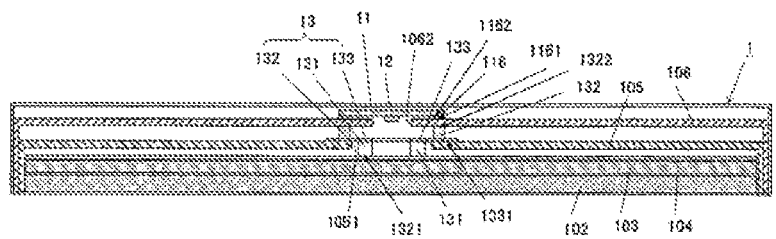
FIG. 17 is a main part sectional view of an image display device of another embodiment seen from above.

FIG. 17 is a main part sectional view of a liquid crystal image display device 1 of another embodiment seen from above. The same reference signs as those in the above embodiments denote the same functions and therefore description thereof will be omitted as appropriate.

The liquid crystal image display device 1 of the present embodiment includes a liquid crystal display panel 102, a backlight 103 disposed behind the liquid crystal display panel 102, a reflection sheet 104 disposed behind the backlight 103, a panel metal sheet 105 disposed behind the reflection sheet 104, and a base metal sheet 106 disposed behind the panel metal sheet 105 (FIG. 17). The liquid crystal image display device 1 also includes an optical sensor 12 that measures light from the back surface of the reflection sheet 104, a substrate 11 having the optical sensor 12 thereon, and a tubular cushion 13 for preventing the entry of external light into the optical sensor 12. The substrate 11 is mounted over the base metal sheet 106 with two block-shaped cushions 116 disposed at a predetermined interval therebetween (FIG. 17). The substrate 11 is mounted over the base metal sheet 106 in such a manner to block a light-receiving hole 1062 of the base metal sheet 106. The tubular cushion 13 is contactlessly inserted in a lighting hole 1051 of the panel metal sheet 105 (FIG. 17). The cushions 116 are formed of an insulating material.

Figure 18:
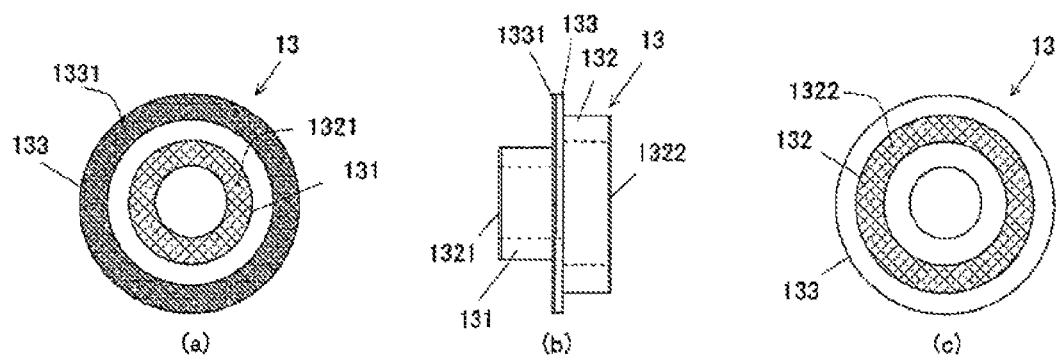

In the liquid crystal image display device 1 of the present embodiment, the front surface of the tubular cushion 13 is bonded to the reflection sheet 104, and the back surface thereof is bonded to the front surface of the base metal sheet 106 (FIG. 17). FIG. 18 includes diagrams showing the tubular cushion 13 of the present embodiment, in which FIG. 18(*a*) is a front view; FIG. 18(*b*) is a side view; and FIG. 18(*c*) is a rear view. The tubular cushion 13 includes a first tubular member 131, a second tubular member 132, and a sheet-shaped connecting member 133 connecting these tubular members by bonding. The inner diameter of the second tubular member 132 is set to a larger size than the outer diameter of the first tubular member 131, and the outer diameter of the connecting member 133 is set to a larger size than the outer diameter of the second tubular member 132 [FIG. 17, FIGS. 18(*a*), 18(*b*), and 18(*c*)]. The tubular cushion 13 of the present embodiment has a double-sided tape 1321 stuck to the front surface of the first tubular member 131 and a double-sided tape 1331 stuck to the front back surface of the connecting member 133. Further, a double-sided tape 1322 is stuck to the back surface of the second tubular member 132 [FIG. 18(*b*)]. The tubular cushion 13 is formed by combining sponge foams formed of a rubber material such as urethane or silicone. The connecting member 133 is formed of an insulating material.

In the present embodiment, the front surface of the first tubular member 131 of the tubular cushion 13 is bonded to the reflection sheet 104 using the double-sided tape 1321, and the back surface of the second tubular member 132 of the tubular cushion 13 is bonded to the base metal sheet 106 using the double-sided tape 1322 (FIG. 17). Further, using the double-sided tape 1331, the front surface of the connecting member 133 of the tubular cushion 13 is bonded to the first tubular member 131, as well as is bonded to the back surface of the panel metal sheet 105. Furthermore, the back surface of the connecting member 133 of the tubular cushion 13 is bonded to the second tubular member 132 of the tubular cushion 13 using a double-sided tape (no reference sign).

According to the present embodiment, the gap between the tubular cushion 13 and reflection sheet 104 is eliminated in a state in which the substrate 11 is mounted over the base metal sheet 106 in a manner insulated from each other. Thus, the amount of light from the backlight 103 can be measured accurately. Specifically, since the front surface (1321), the central connecting part (1331), and the back surface of the tubular cushion 13 are bonded to the respective predetermined positions, the distance between the area serving as a measurement light source on the back surface of the reflection sheet 104 and the optical sensor 12 is kept constant. The size of the area serving as a measurement light source on the back surface of the reflection sheet 104 is also kept constant. Further, the members 131, 132, and 133 forming the tubular cushion 13 serve as buffer members. Thus, the substrate 11 is insusceptible to the warpage or deformation of the base metal sheet 106 and panel metal sheet 105. As a result, the amount of light from the backlight 103 can be measured accurately.

Figure 19:
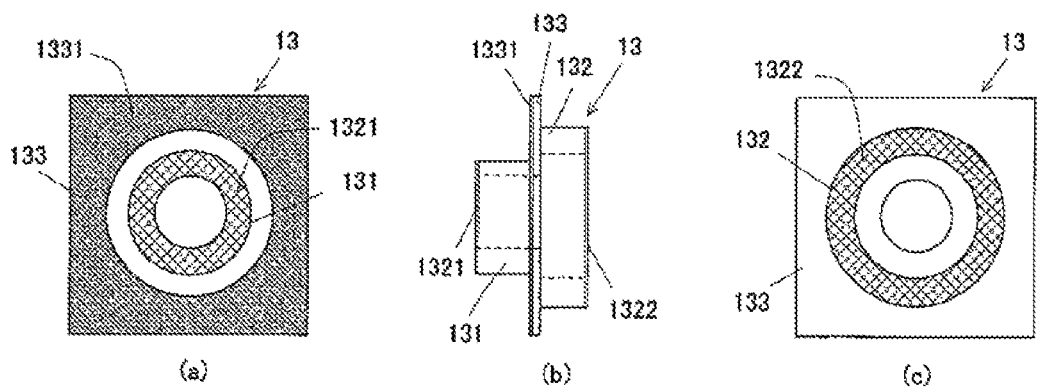
Figure 20:
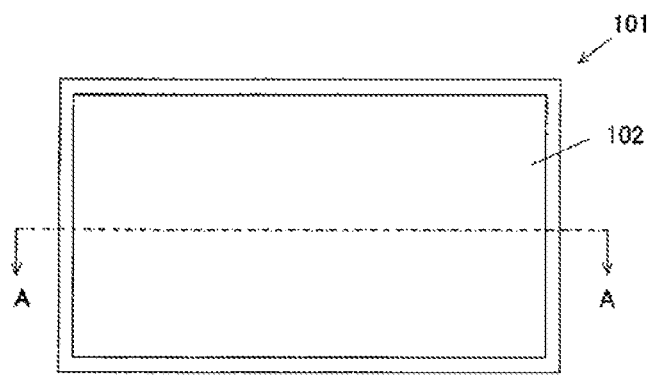
FIG. 20 is a schematic front view of a traditional liquid crystal image display device.
Figure 21:
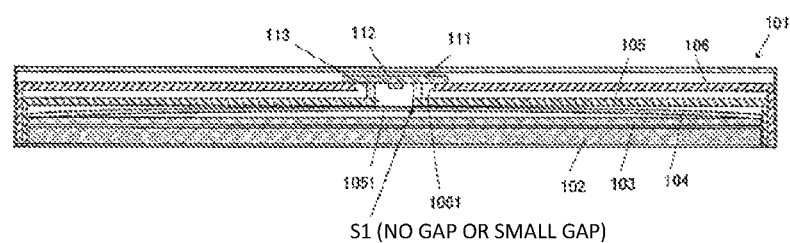
FIG. 21 is a main part sectional view of the traditional liquid crystal image display device seen from above.
Figure 22:
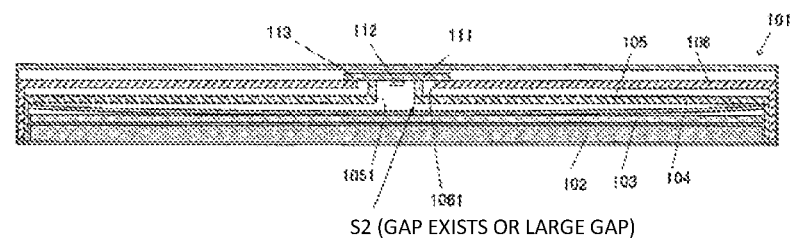
FIG. 22 is a main part sectional view of the traditional liquid crystal image display device seen from above and is a view at a different temperature.

FIG. 19 includes diagrams showing another example of the tubular cushion 13 of the present embodiment, in which FIG. 19(*a*) is a front view; FIG. 19(*b*) is a side view; and FIG. 19(*c*) is a rear view. In the tubular cushion 13 of this example, the connecting member 133 has a rectangular shape.

Examples of the shape of the connecting member 133 include a circle, a rectangle, a hexagon, and other polygons. Examples of the material of the connecting member 133 include a paper sheet, a resin sheet, and a metal sheet. More specifically, a double-sided tape may be used as the connecting member 133.

In the present embodiment, the rubber hardness of the second tubular member 132 is set to a lower degree than that of the first tubular member 131. According to the present embodiment, the substrate 11 is insusceptible to the vibration or the like of the panel metal sheet 105 or base metal sheet 106, as well as is less likely to be displaced.

While the tubular cushion 13 are composed of the first tubular member 131, the second tubular member 132, and the sheet-shaped connecting member 133 connecting these tubular members by bonding in the present embodiment, this configuration is illustrative only. For example, the tubular cushion 13 may be molded in one piece.

The present invention is not limited to the above embodiments. The bonding means is not limited to the double-sided tapes, and any bonding means may be used as long as it can eliminate the gap between the tubular cushion 13 and reflection sheet 104. For example, an adhesive such as a rubber-based adhesive, acrylic-based adhesive, or epoxy-based adhesive may be used. The shape of the tubular cushion 13 is not limited to the cylindrical shape. The tubular cushion may be in any shape as long as it can prevent the entry of external light into the optical sensor 12 so that light from the back surface of the reflection sheet 104 can be measured accurately. For example, the tubular cushion may be in the shape of a rectangle tube, hexagon tube, or other polygonal tubes. The optical sensor mounting structure of the present invention may be incorporated into an image display device which is being assembled, or may be retrofitted into an assembled image display device. As seen above, changes can be made to the present invention as appropriate without departing from the spirit and scope of the invention.

DESCRIPTION OF NUMERALS

1 image display device (liquid crystal image display device)
11 substrate
12 optical sensor
13 tubular cushion (first cushion)
14 tubular cushion (second cushion)
114, 115, 116 block-shaped cushion (second cushion)

102 image display panel (liquid crystal display panel)
103 backlight
104 reflection sheet
105 panel metal sheet
106 base metal sheet
1051 lighting hole
1061 through hole
1301, 1302, 1401, 1402 double-sided tape (adhesive)

The invention claimed is:

1. An optical sensor mounting structure for use in image display devices comprising:
    an optical sensor configured to measure light from a back surface of a reflection sheet in an image display device;
    a substrate having the optical sensor thereon;
    a tubular cushion for preventing entry of external light into the optical sensor, and
    a second cushion disposed outside the tubular cushion serving as a first cushion and configured to support the substrate;
    wherein a panel metal sheet is disposed behind the reflection sheet;
    wherein a front surface of the tubular cushion and the reflection sheet are bonded together;
    wherein a back surface of the tubular cushion and the substrate are bonded together;
    wherein a front surface of the second cushion and the panel metal sheet are bonded together; and
    wherein a back surface of the second cushion and the substrate are bonded together.

2. The optical sensor mounting structure of claim 1, wherein rubber hardness of the second cushion is lower than rubber hardness of the first cushion.

3. The optical sensor mounting structure of claim 1, wherein
    a lighting hole is formed in the panel metal sheet, and
    the first cushion is contactlessly disposed in the panel metal sheet.

* * * * *